United States Patent [19]

Whipple et al.

[11] Patent Number: 4,716,545
[45] Date of Patent: Dec. 29, 1987

[54] MEMORY MEANS WITH MULTIPLE WORD READ AND SINGLE WORD WRITE

[75] Inventors: David L. Whipple, Braintree; Edward D. Mann, Methuen, both of Mass.

[73] Assignee: Wang Laboratories, Inc., Lowell, Mass.

[21] Appl. No.: 713,365

[22] Filed: Mar. 19, 1985

[51] Int. Cl.$^4$ .............................................. G06F 13/00
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 4,099,231 | 7/1978 | Kotok et al. | 364/200 |
| 4,126,897 | 11/1978 | Capowski et al. | 364/200 |
| 4,149,239 | 4/1979 | Jenkins et al. | 364/200 |
| 4,370,712 | 1/1983 | Johnson et al. | 364/200 |
| 4,378,591 | 3/1983 | Lemay | 364/200 |
| 4,438,493 | 3/1984 | Cushing et al. | 364/200 |

*Primary Examiner*—Raulfe B. Zache
*Assistant Examiner*—Michael J. Ure
*Attorney, Agent, or Firm*—Michael H. Shanahan; Gordon E. Nelson

[57] ABSTRACT

A memory system connected by means of a system bus to other components of a data processing system. The memory system includes a memory control unit and at least one memory unit in which information units containing two words are stored. The memory control unit is connected to the system bus and receives system addresses and memory commands from the system bus, and depending on the memory command, receives data from or provides data to the system bus. A memory bus and lines for control signals specifying memory requests connect the memory control unit and the memory unit. The memory bus is time multiplexed between memory addresses and information units. The memory control unit receives a memory command, a system address, and in the case of a write command, system data on the system bus and produces the memory requests, memory addresses, and information units required to carry out the memory command. The memory unit responds to a multiple double read request produced from a read octal word memory command specifying a read of 8 words by generating the sequence of addresses required to serially output the information units containing the 8 words on the memory bus. The memory control unit receives the sequence of information units and provides the 8 words contained therein in order to the system bus.

17 Claims, 9 Drawing Figures

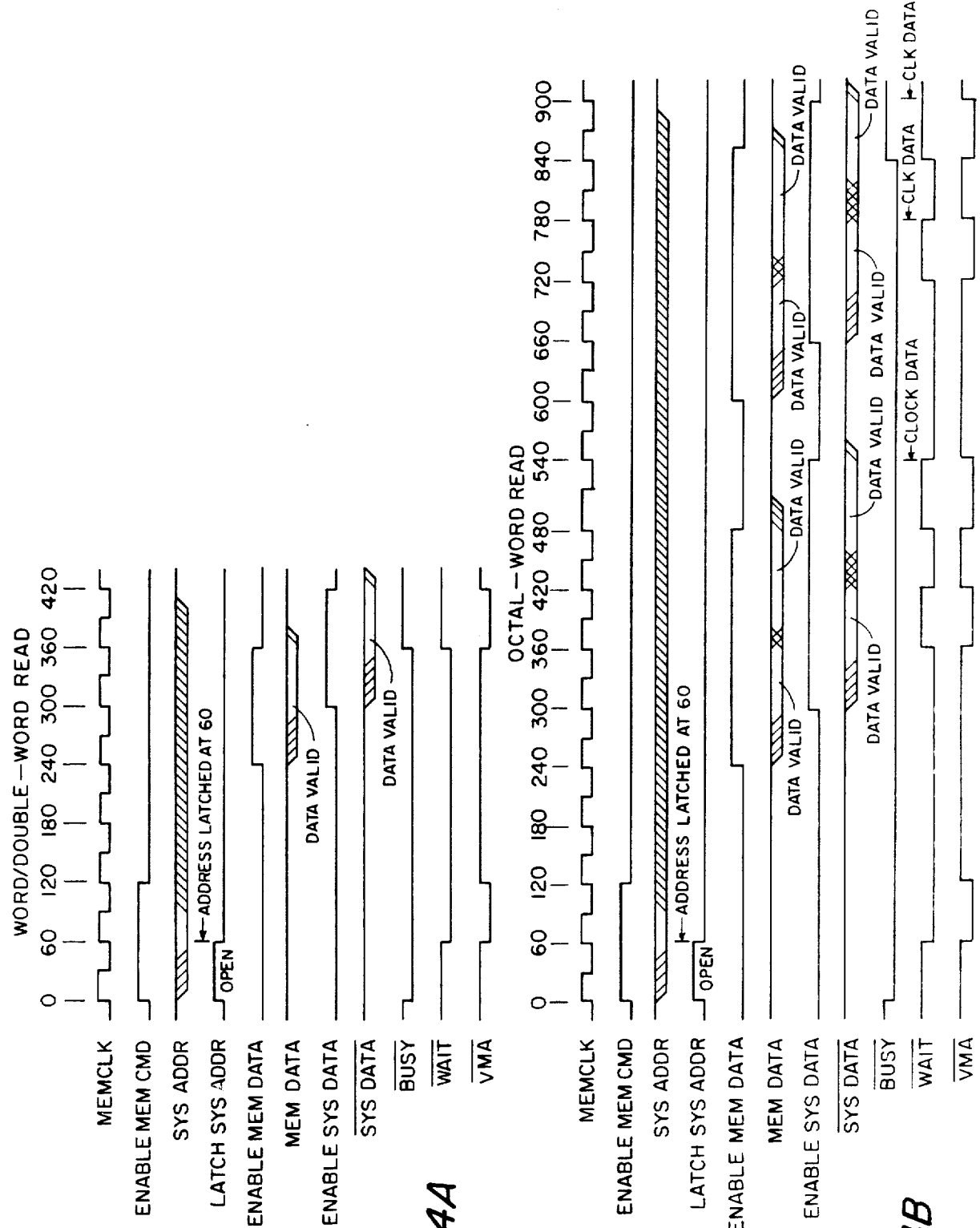

MEMORY MEANS WITH MULTIPLE WORD READ AND SINGLE WORD WRITE

BACKGROUND OF THE INVENTION

1. Field of the Invention

The present invention relates to a memory for storing information in an information processing system and, more particularly, to a multi-word wide memory having multiple word read capability and single word write capability.

2. Description of the Prior Art

All information processing systems include some form of memory for storing information, that is, data and intructions, to be operated upon by the system. For example, in a typical system the data and instructions are written into the memory until required by the system processing elements, are read from the memory to the processing elements to be operated upon, and the results written back into memory. In addition, in many systems the memory is the primary information path through the system. That is, information is usually transferred between two elements of the system, such as a central processing unit and an input/output controller, through the memory. As such, the speed and ease with which information may be read from or written into memory is a primary factor in determining the performance of the system.

In many systems, the speed of the system is increased by making the width of the system memory and system bus a multiple of the basic elements of information used by the system. For example, a system may basically operate on elements of information, referred to as words, which contain 32 bits of information. The system bus and memory may accordingly be two words, or 64 bits, wide so that two words are transferred on each memory read or write operation.

A first limitation on memory performance arises because many operations performed by the system involve the transfer of more information than can be contained within a single width of the system memory or bus. For example, a central processing element may perform a cache fill operation which involves the transfer of four, eight or sixteen words. In the example of the memory and bus described just above, this would require, respectively, two, four or eight memory operations. While the memory and bus widths may be increased to acommodate such operations, this solution is very expensive to implement for very wide memories and busses.

A related problem occurs in memory write operations in that the memory width is not conveniently related to the sizes of most information elements written into memory. That is, many memories are a double word wide and read and write a double word at a time. The system, however, performs most operations on information elements of a word or less in size and as such many write operations are of elements, for example, a word, that are less than a full memory information unit.

The present invention provides a memory structure and operation having improvements and features which address the above described problems and limitations, and others.

SUMMARY OF THE INVENTION

The present invention relates to a memory wherein the basic unit of information storage is a multiple of word size used in the system and which provides, in the read aspect, for reads of multiple information units in a single read operation and, in the write aspect, for writes of a single word at a time.

In the read aspect, the memory includes a memory unit for storing information to be operated upon by the system, a memory unit including a memory storage means for storing units of information and a memory unit control means responsive to memory read requests for generating corresponding addresses of information unit storage locations in the memory storage means. Each read request includes an initial address and specifies a number of units of information. The memory unit control means is responsive to a request specifying one or more units of information for generating in a single memory operation a sequence of addresses, the sequence of addresses beginning at the initial address and containing a number of addresses equal to the specified number of information units. The memory storage means is responsive to the sequence of addresses for reading information units from the corresponding sequence of memory storage means locations in the single memory operation.

In a further embodiment, the memory storage means includes a first memory plane means containing storage locations having successive even addresses and second memory plane means containing storage locations having successive odd addresses. There is a first output latch connected from the information output of the first memory plane means for receiving and storing units of information read therefrom and second output latch connected from the information output of the second memory plane means for receiving and storing units of information read therefrom. Finally, there is a memory unit output selector connected from the first and second latch and responsive to a current address to select and read from an output latch the information unit corresponding to the current address.

In this embodiment, the first and second memory plane means are responsive to each address provided thereto to read an information unit from the corresponding location in one of the memory plane means and into the corresponding output latch means and to concurrently read the information unit from the corresponding next location in the other of memory plane means and into the corresponding output latch means. The memory unit control means is responsive to each memory read request to provide the initial and each alternate successive address of a sequence of addresses to the first and second memory planes to read corresponding pairs of information units therefrom and to provide each successive address of a sequence of addresses to the memory output selector to select and read from the memory unit means the successive memory information units of a sequence of one or more information units.

In the write aspect, the memory unit means includes a memory storage means including at least one memory plane means containing locations for storing units of information and, as previously described, each unit of information comprises a plurality of words of information. Each memory plane means in turn comprises a corresponding plurality of sub-plane means containing storage locations for words, wherein each memory plane means location for storing a unit of information is comprised of a word storage location from each of the sub-plane means.

Each write request includes a write address and a command specifying the number of words of information to be written. The memory unit control means is responsive to a write request address for generating a memory plane address identifying the corresponding plurality of sub-plane word locations comprising the information unit storage location wherein information is to be written, and to the write request command for generating one or more write enable signals identifying the sub-plane means corresponding to the words to be written. The sub-plane means are responsive to the memory plane address and to the enable signals to write the information into the corresponding word storage locations.

Other objects, advantages and features of the present invention will be understood by those of ordinary skill in the art after referring to the following detailed description of the preferred embodiment and drawings, wherein:

BRIEF DESCRIPTION OF THE DRAWINGS

FIGS. 4A, 4B, 4C, 4D, 4E and 4F are timing diagrams illustrating the operation of the present memory.

DESCRIPTION OF A PREFERRED EMBODIMENT

The following description presents the structure and operation of a computer system incorporating a presently preferred embodiment of the present invention. In the following description, the overall structure and operation of the system will first be presented at an overall block diagram level. Then the memory of the present invention and certain features thereof will be described in detail with the aid of block diagrams and timing diagrams.

Reference numbers referring to system elements appearing in the figures are comprised of three digits. The two least significant (rightmost) digits identify a particular element appearing in a particular drawing and the most significant (leftmost) digit refers to the figure in which that element first appears. For example, a particular system element may first appear as the 12th element in FIG. 1; that element would then be referred to by the reference number 112. Any such reference number is, as just described, assigned the first time a particular element appears in the following description and will then be used throughout the remainder of the description and drawings whenever that element is referred to.

A. Block Diagram Structure and Operation (FIG. 1)

Figure 1:
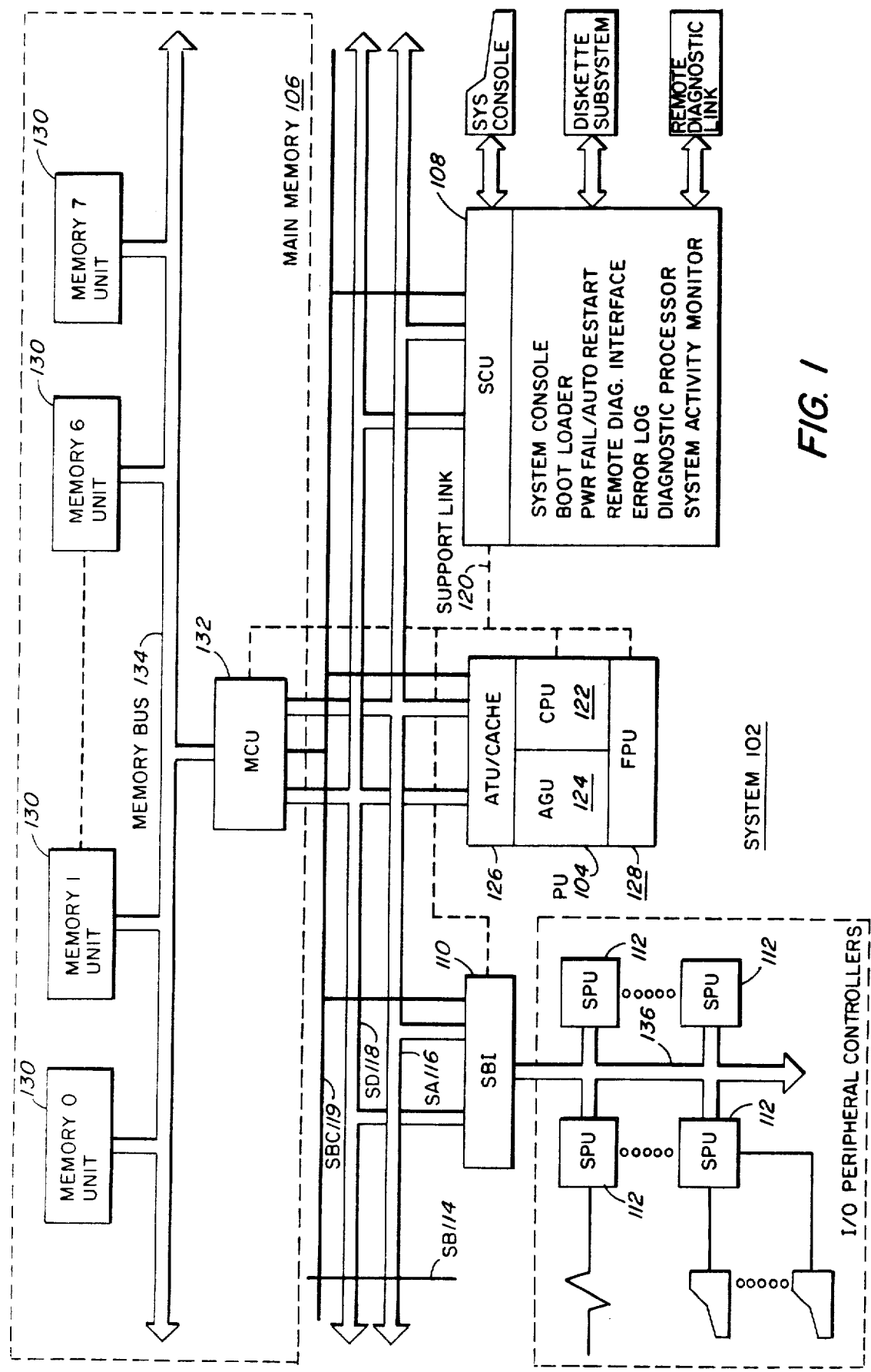
FIG. 1 is a block diagram of a computer system incorporating the present invention.

Referring to FIG. 1, therein is presented a block diagram of a System 102 incorporating the present invention. As indicated therein, System 102 includes a Processor Unit (PU) 104, a Main Memory (MM) 106, a System Control Unit (SCU) 108, and a Sytem Bus Interface (SBI) 110 with one or more Satellite Processing Units (SPUs) 112. These elements are bidirectionally connected to and interconnected by a System Bus (SB) 114 which is comprised of a bidirectional System Address (SA) Bus 116, a bidirectional System Data (SD) Bus 118 and a System Bus Control (SBC) Link 119. SA Bus 116 and SD Bus 118 provide, respectively, for the transfer of addresses and data among the elements of System 102. SBC Link 119 provides a mechanism for controlling access to SB 114 by the various users of SB 114, for example, PU 104, MM 106, SCU 108 and SBI 110 and for the control of MM 106 operations. Certain elements of System 102, again, for example, PU 104, SCU 108, MM 106 and SBI 110, are further interconnected through Support Link (SL) Bus 120. As described further below, SL Bus 120 provides access and communication between SCU 108 and the internal operations of certain elements of System 102.

Referring first to PU 104, PU 104 includes a Central Processor Unit (CPU) 122 which executes operations on data under the control of processes, that is, under control of instructions received during execution of a program. As will be described in greater detail in the following, CPU 122 and the associated elements of PU 104 are microprogram controlled, with CPU 122 executing one macroinstruction each CPU cycle and one microinstruction at a time.

CPU 122 primarily performs binary and decimal integer arithmetic and logical operations and executes general instructions of the types described further below. CPU 122 also performs certain address generation operations in support of Address Generator Unit (AGU) 124, for example, instruction address relative calculations. As indicated in FIG. 1, CPU 122 is one of the System 102 elements connected with SL Bus 120.

Associated with CPU 122 is an Address Generator Unit (AGU) 124, which includes a macroinstruction prefetch and queue mechanism. AGU 124 fetches instructions and generates, from the fields of the instructions, virtual addresses referring to operands to be operated upon by those instructions and dispatch addresses identifying microinstuction routines for executing those instructions. AGU 124 also generates, again from the fields of current instructions, virtual addresses of next instructions to be executed.

As will be described further in the following, ACU 124 and CPU 122 may thereby be respectively described as instruction operation and execution operation units. AGU 124 and CPU 122 operate separately and concurrently to provide overlap of instruction fetching, instruction decoding, operand fetching and instruction execution, thereby enhancing the internal performance of PU 104.

Associated with CPU 122 and AGU 124 is Address Translation Unit/Cache (ATU/C) 126, which operates as the data and address path between PU 104 and SB 114, with CPU 122 and AGU 124 being linked together and to ATU/C 127 by PU 104 internal data and address paths. As previously described, AGU 124 generates virtual addresses, that is, addresses of instructions and operands relative to the address space of a process; a process being an entity for executing programs for a user and being represented by an address space and a current state of execution of a program. ATU/C 126 operates with respect to AGU 124 to translate virtual addresses into corresponding physical addresses within System 102's address space, for example, for reads from and writes to MM 106. ATU/C 126 also operates as a cache mechanism with respect to CPU 122, that is, fetches and stores operands and instructions in advance of CPU 122 operations. Again, ATU/C 126 operates concurrently with CPU 122 and AGU 124.

PU 104 may further include a Floating Point Unit (FPU) 128 for performing floating point arithmetic operations concurrently with other operations of PU 104, for example, CPU 122. FPU 128 is another System 102 element connected from SL Bus 120.

Referring to MM 106, as indicated in FIG. 1, MM 106 includes one or more Memory Units (MUs) 130 for storing data and instructions and a Memory Control Unit (MCU) 132 which controls the reading and writing of data and instructions from and to MUs 130. MCU is connected from SA Bus 116, SD Bus 118 and SBC Link 119 and is one of the System 102 elements connected from SL Bus 120.

SCU 108 primarily performs overall system control and support operations. As indicated in FIG. 1, SCU 108 may operate as a system console and may provide a diskette subsystem, for example, for the loading of microcode into PU 104. SCU 108 may also provide local diagnostic functions, and may provide a link for remote diagnostics. Other functions of SCU 108 may include power failure and automatic restart functions, error logging and system activity monitoring.

Referring finally to SBI 110 and SPUs 112, SPUs 112 are intelligent controllers/interfaces for peripheral devices, such as printers, communications links, terminals and disc drives. SPUs 112 are in turn connected with SBI 110 through Input/Output (IO) Bus 136. SBI 110 operates, in cooperation with SPUs 112, as a communications interface between IO Bus 136 and System Bus 114 to transfer information between the peripheral devices and the elements of System 102.

Figure 2:
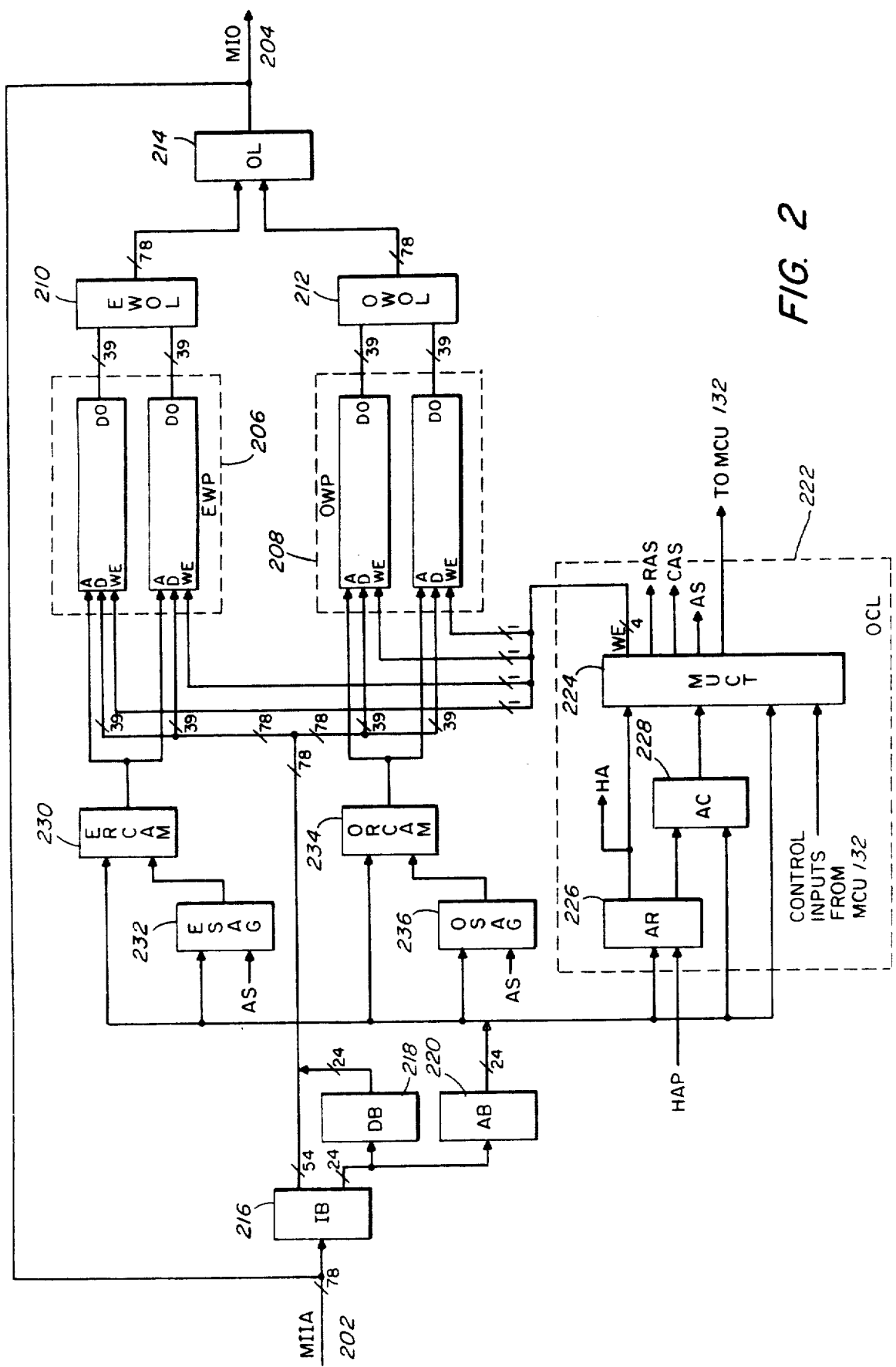
FIG. 2 is a block diagram representation of a memory unit.
Figure 3:
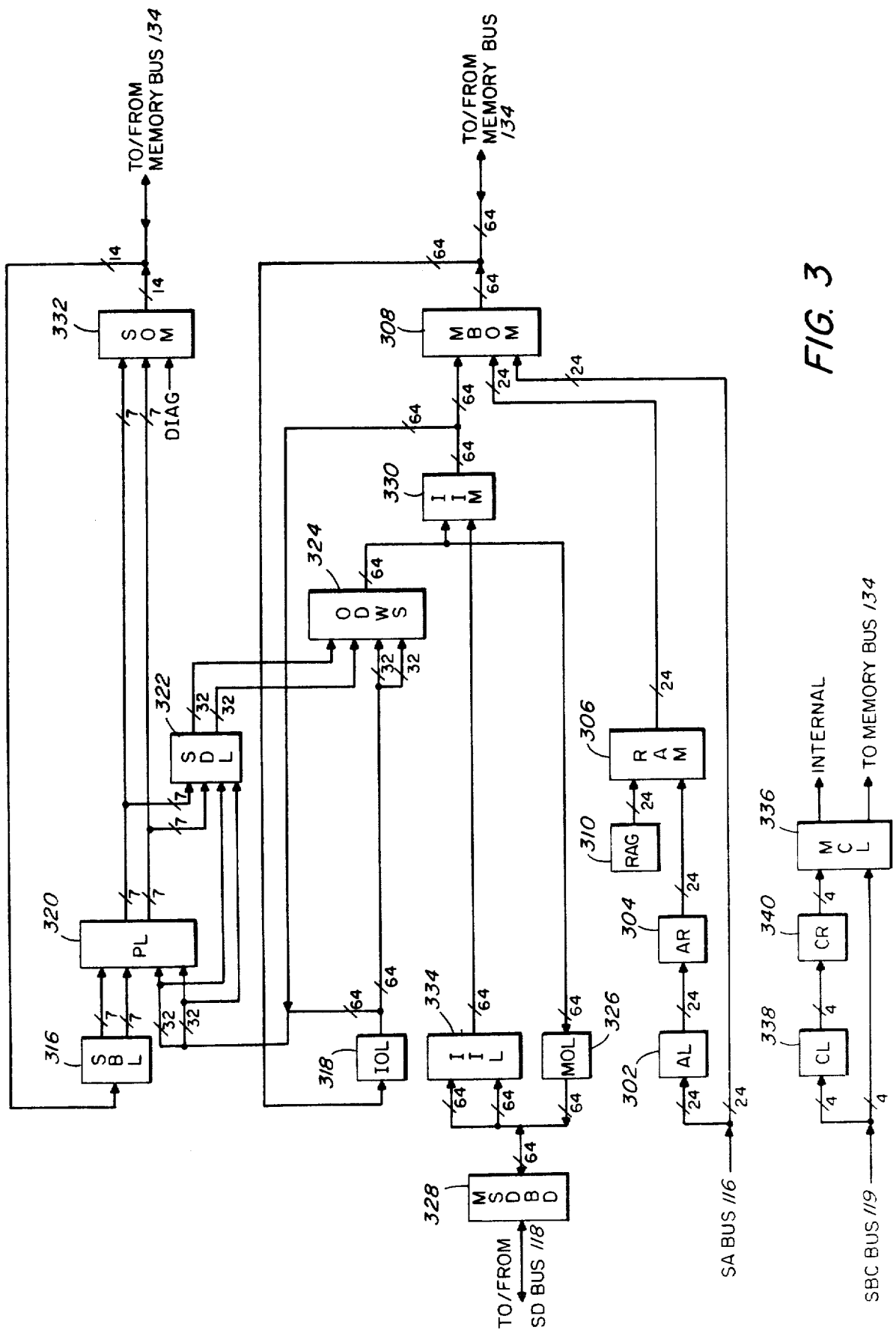
FIG. 3 is a block diagram representation of a memory control unit.
Figure 4C:
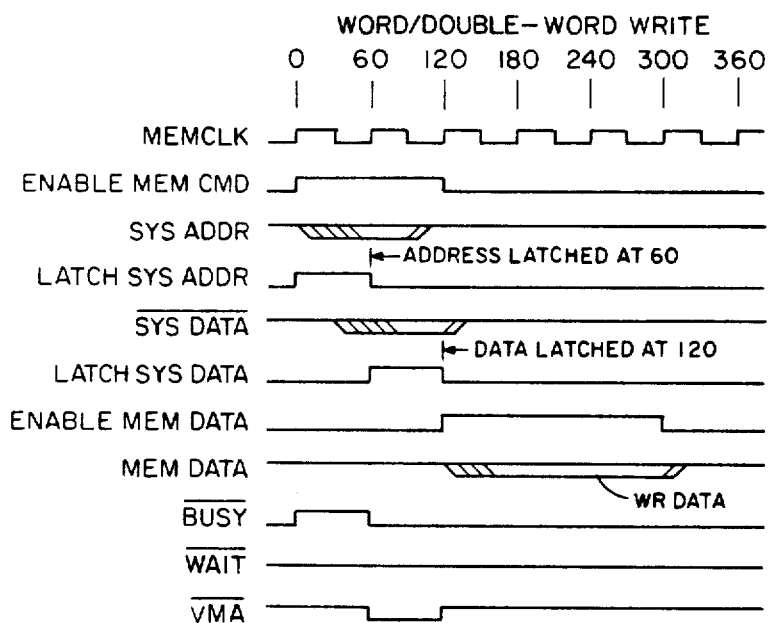
Figure 4D:
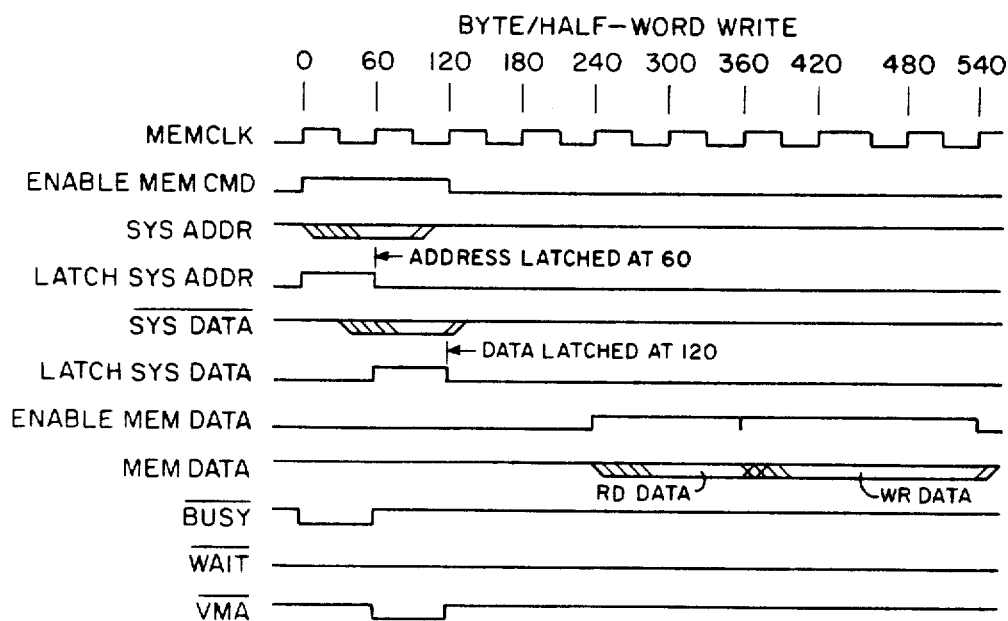
Figure 4E:
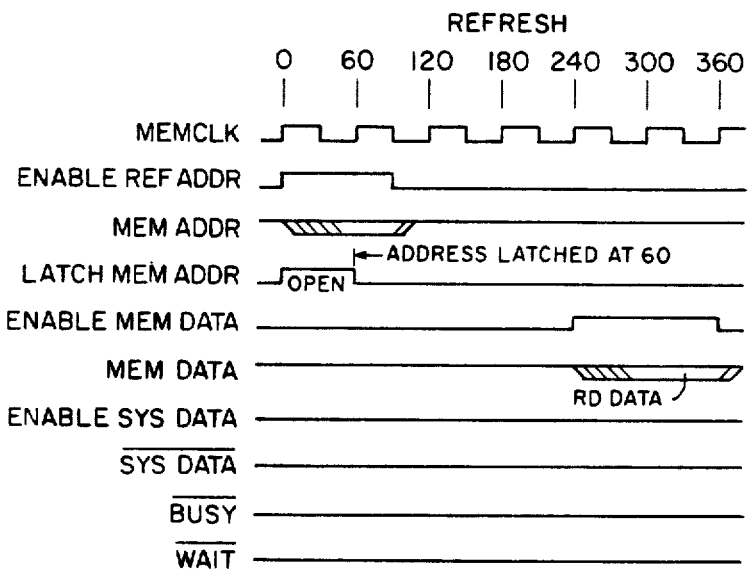
Figure 4F:
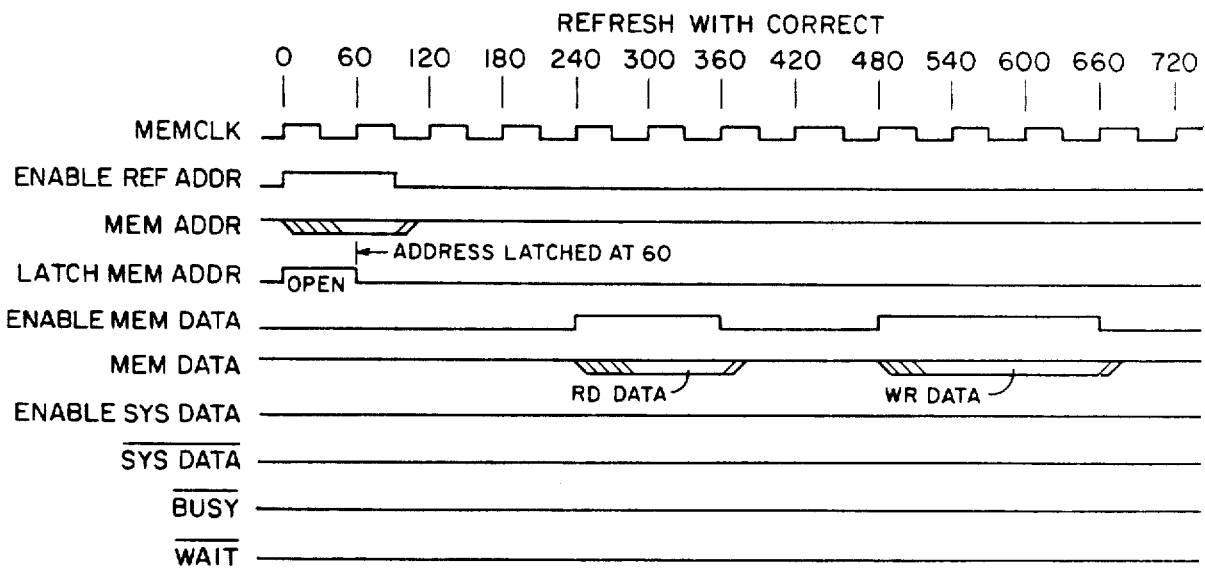

B. Detailed Description of Main Memory (MM) 106 (FIGS. 1, 2 and 3)

A previously described, MM 106 comprises System 102's physical memory and is used to store data and programs to be operated upon by PU 104. Information is communicated between MM 106 and the other elements of System 102, for example, PU 104 or SBI 110 and SPU's 112, through System Bus (SB) 114 in response to addresses and commands provided thereupon.

As shown in FIG. 1, MM 106 includes one or more Memory Units (MUs) 130 for storing data and instructions and a Memory Control Unit (MCU) 132 which controls the reading and writing of data and instructions from and to MUs 130. MCU is bidirectionally connected from SB 114 and is bidirectionally connected to MUs 130 through Memory Bus 134. Memory Bus 134, as described below, is comprised of a data/address bus and control busses for communicating memory operation control signals between MCU 132 and the MUs 130.

After briefly reviewing the System 102 data structures operated upon by MM 106 and SB 114, the following will frist describe the structure and operation of MM 106, including Memory Units (MU's) 130 and Memory Control Unit (MCU) 132, in that order. Those portions of an MU 130 which are of conventional construction and will be well understood by those of ordinary skill in the art will not be described herein in full detail. Those portions of MU 130 which are relevant to the present invention will, however, be described in detail.

B.1 Data Structure of System 102

As previously described, information is operated upon by the elements of System 102 in logical units of bytes and multiples thereof and is accordingly organized as multiples of one or more bytes. In this regard, SD Bus 118 is a double word wide bus and all information transfers through SD Bus 118 are accordingly in double word (64 bit) format. The actual information content of such a double word format may, however, be a byte, a half word (2 bytes), a word (4 bytes), or a double word (8 bytes).

As will be described in further detail below, all reads from MM 106 are of double words containing 64 bits of information while writes to MM 106 may be of bytes, half words, words or double words. Similarly, information is stored in the MUs 130 in essentially double word structures.

As just described, all writes are in double word format and the memory operation command provided to MM 106 through SBC Bus 119 will indicate what portion of the double word format contains actual information. As also described below, MM 106 will then extract the actual information bits from the double word format and write those bits into the correct locations in the MU 130 double word addressed by the write operation.

B.2 Memory Units (MUs) 130 (FIG. 2)

As described above, the memory elements comprising System 102's physical memory reside in MUs 130, the size of System 102's physical memory being thereby determined by the number of MUs 130 in MM 106 and the storage capacities of the individual MUs 130. The writing of information to and the reading of information from the MUs 130 is controlled by MCU 132, with information and addresses being communicated between the MUs 130 and MCU 132 through Memory Bus 134. As described above, Memory Bus 134 includes further buses for communicating certain control signals, such as a memory clock, refresh commands, and commands for certain specific memory operations, from MCU 132 to the MUs 130.

As described further below, all reads from and write to an MU 130 are of double words or multiples thereof and information is stored in an MU 130 in double words. The writing of bytes and half words is performed by MCU 132, which extracts bytes and half words to be written from the double word formats in which they appear to MCU 132 from SB 114 and formats the bytes and half words into double words to be written into the MUs 130. As described further below, single words are written directly into the MUs 130 by the MU 130 write control mechanism.

It should be further noted that while a double word was previously described as containing 64 bits of information, a double word within MEM 106, that is, as stored in an MU 130, contains 78 bits wherein the additional 14 bits are syndrome bits for error detection and correction. These bits are added by MCU 132 when writing information to MUs 130 and are used by MCU 132 when reading information from MUs 130. As such, and for the purposes of the following descriptions, the term "double word" will be used for both 64 bit wide words and 78 bit wide words containing syndrome bits. The particular meaning of "double word" at a given point in the descriptions will be apparent from the description and will depend upon the area of MM 106 being described, that is, whether the double words also include syndrome as well as information bits.

It should also be noted, as described below, that a 78 bit double word residing in an MU 130 is structurally organized as a pair of 39 bit single words. Each such single word comprises 32 information bits and 7 syndrome bits with the syndrome bits associated with a single word pertaining solely to that single word, rather than to the pair of single words comprising a double word. Again, the particular meaning of "single word" or "word" at a given point in the descriptions will be apparent from the description and will depend upon the area of MM 106 being described, that is, whether the double words also include syndrome as well as information bits.

Referring to FIG. 2, therein is presented a block diagram of a single MU 130. As shown in FIG. 2, an MU 130 has a 78 bit wide Memory Input Information-/Address (MIIA) Bus 202 connected from Memory Bus 134 for receiving read/write addresses and information to be written into the MU 130. A 78 bit wide Memory Information Output (MIO) Bus 204 is similarly connected to Memory Bus 134 for providing information read from the MU 130 to Memory Bus 134.

MIIA Bus 202 and MIO Bus 204 are logically and functionally connected together by Memory Bus 134 to comprise a single MU 130 input/output bus. The number of connections into and out of an MU 130 are therefore reduced in the present implementation by internally connecting together MIIA Bus 202 and MIO Bus 204 to form a single internal bus, as shown in FIG. 2. Only a single set of bus conductors is thereby required to connect both MIIA Bus 202 and MIO Bus 204 to Memory Bus 134. As is apparent from this configuration, the writes of information to MUs 130 and the reads of information from MUs 130 are interleaved, that is, are performed in separate read and write cycles rather than being performed concurrently.

As shown in FIG. 2, the information storage elements in an MU 130 are organized into an Even Double Word Memory Plane (EWP) 206 and an Odd Double Word Memory Plane (OWP) 208. EWP 206 and OWP 208 are identical and symmetric, being connected in parallel and each being a double word wide. As previously described, EWP 206 and OWP 208 are each internally organized as two parallel single word wide sub-planes with corresponding address locations in the two single word wide sub-planes containing the two single words comprising a double word. That is, the address of a double word in either EWP 206 or OWP 208 refers to matching and corresponding storage locations in the two single word sub-planes comprising either EWP 206 or OWP 208; these corresponding single word wide storage locations contain the two single words which together comprise the addressed double word.

EWP 206 and OWP 208 are of conventional structure, being arrays of commercially available memory elements with row and column addressing to address individual locations therein and row and column address strobe and write enable inputs to control the operations of the memory element arrays. It should be noted that, as shown in FIG. 2, the four single word wide sub-planes comprising EWP 206 and OWP 208 are provided with separate write enable inputs from the MU 130 control logic, described further below.

The address space of EWP 206 and OWP 208 is organized such that the address locations of successive double words are located alternately in EWP 206 and OWP 208, with even numbered addresses located in EWP 206 and odd numbered addresses located in OWP 208. This address organization reduces the interleaving of information within EWP 206 and OWP 208 so that successive reads or writes of double words are most frequently to EWP 206 and OWP 208 alternately. This in turn increases the speed with which successive double word reads or writes may be performed, thereby increasing the speed of operation of MM 106 and, as described below, allowing the pipelining of reads of successive double words from an MU 130.

Within EWP 206 or OWP 208, successive even or odd double words are stored in successive address locations with, as described above, the paired single word storage locations of the sub-planes containing the two single words comprising a given double word.

Considering MU 130's information output and input paths, the two 39 bit wide data output (DO) paths of the two sub-planes comprising EWP 206 and OWP 208 are connected in parallel to, respectively, inputs of Even Word Output Latch (EWOL) 210 and Odd Word Output Latch (OWOL) 212. The data output paths of EWP 206 and OWP 208 are therefore functionally 78 bits, or a double word wide, and, as described below, reads from EWP 206 and OWP 208 are of double words, that is, of parallel, matching single words from each of the single word wide sub-planes of EWP 206 and OWP 208. The 78 bit wide outputs of EWOL 210 and OWOL 212 are in turn connected in parallel to the input of Output Latch (OL) 214, the 78 bit output of which is in turn connected to Memory Bus 134.

This output path structure, that is, with each memory plane having an output latch driving in turn a single, shared output path latch, allows successive reads of double words. For example, and as described further below in reference to the MU 130 addressing mechanism, a single address input from MCU 132 may be used to read a double word from each of EWP 206 and OWP 208, that is, an even or odd double word from one memory plane and the next successive odd or even double word from the other memory plane. These two double words are then concurrently latched into EWOL 210 and OWOL 212 and the addressed word selected by the original address and passed to OL 214 to be passed in turn to Memory Bus 134. The next successive double word, already latched in its respective memory plane output latch, may then be read from that memory plane output latch and through OL 214 to Memory Bus 134 without having to re-address EWP 206 and OWP 208 to obtain that next double word. As such, two successive double words may be read to Memory Bus 134 and SD Bus 118, and thus to a requestor, at the data rate of the busses, so that the requestor receives a "burst" of two double words. This feature thereby significantly increases the speed with which multiple double words may be read from memory and to a requestor.

To reiterate, a single addressing operation may thereby read four successive words from an MU 130 in what may be referred to as a quad-word read operation. In such an operation, a single address will result in parallel, concurrent reads of two successive double words, each from its respective memory plane, followed by successive selection and reading of each of the double words. As will be described further below, the addressing mechanism of MUs 130 further allows the execution of multiple, successive quad-word read operations in response to a single address input. In the present implementation, for example, the provision of a single address and corresponding command from MCU 132 to an MU 130 can result in two successive quad-word read operations, so that eight words are read in a single operation referred to as an octal-word read. In this case, the requestor would receive a "burst" of 8 successive words. In alternate embodiments of the present invention, this feature may be extended to yet longer sequences of double words, depending upon the functional characteristics and limitations of the elements requesting memory reads.

Referring now to the MU 130 input path, as previously described MIIA Bus 202 is the input path to an MU 130 from Memory Bus 135 and MCU 132. As will be described further below in reference to timing diagrams illustrating MM 106 operations, addresses and information are time multiplexed to an MU 130's input, that is, to MIIA Bus 202, as required by the operation being performed.

As also previously described, physical addresses in System 102 are 24 bits wide, so that 54 of the 78 bits of the MU 130 input are used solely for information while 24 are used for both information and addresses. In other implementations of System 102 wherein physical addresses are expanded to 31 bits, 47 of the MU 130 input bits will be used solely for information and 31 for both information and addresses. In this case, the following description will be modified only to the extent of increasing the width of certain buffer/latches and busses from 24 bits to 31 bits.

Referring to FIG. 2, as shown therein the 78 bit MIIA Bus 202 is connected to the inputs of 78 bit Input Buffer/Latch (IB) 216. Of the 78 output bits of IB 216, the 54 bits corresponding to those bits used solely for information are connected, in parallel, to the corresponding 54 information bit inputs of EWP 206 and OWP 208. The 24 output bits of IB 216 corresponding to those bits used for both information and addresses are connected to the inputs of 24 bit Data Buffer/Latch (DB) 218 and 24 bit Address Buffer/Latch (AB) 220. As shown in FIG. 2, the 24 bit output of DB 218 is connected in parallel to the corresponding input bits of EWP 206 and OWP 208 while the 24 bit output of AB 220 is provided to the MU 130 addressing mechanism, described further below.

As just described above, the 24 bits appearing at the inputs of DB 218 and AB 220 from IB 216 may comprise either a 24 bit address or 24 of the 78 bits of a double word to be written into the MU 130. When the 24 bits comprise a part of a double word to be written into the MU 130, DB 218 operates to buffer and provide the 24 information bits to the corresponding inputs of EWP Y06 and OWP Y08. These 24 information bits are provided to EWP 206 and OWP 208 in parallel with and concurrently with the corresponding 54 bits provided to EWP 206 and OWP 208 from IB 216. When the 24 bits appearing at the output of IB 216 comprise a 24 bit address, AB 220 operates to buffer and provide the 24 bits of address to the MU 130 addressing mechanism. In this respect, it should be noted that the principle function of DB 218 is to reduce the load on the 24 output bits of IB 216 which are used for both addresses and information inasmuch as these 24 bits must drive inputs of both the memory planes and the addressing mechanism.

Referring now to the MU 130 addressing paths and mechanism, as previously described addresses are provided to the MUs 130 from MCU 132 through Memory Bus 134 while certain control signals, such as a memory clock, refresh commands, and commands for certain specific memory operations, are communicated from MCU 132 to the MUs 130 through an internal memory control bus. As will be described below, the MU 130 addressing mechanism is correspondingly organized into addressing logic and operation control logic. The addressing logic is primarily concerned with generating and providing addresses to EWP 206 and OWP 208.

The operation control logic may, for example, provide row and column strobe signals and write enable signals to EWP 206 and OWP 208 and signals controlling the generation of addresses by the addressing logic, for example, in performing multiple word reads, as previously described.

Referring to FIG. 2, the MU 130 Operation Control Logic (OCL) 222 has control inputs connected from MM 106's control signals portion of Memory Bus 134 and address inputs connected from the certain of the address bit outputs of AB 220. Among the control inputs are a memory clock (MEMCLK), a refresh command (RFRSH), a row address strobe (RAS), a write enable strobe (WRSTB) and commands (MDWD) pertaining to multiple double word read operations. Also included among the control inputs from MCU 132 are an OPEN command, indicating that the MU 130 should open its IBs 216 to receive addresses or data, and commands ODW and DO which together operate as a two bit control code for controlling the reading of information from EWP 206 and OWP 208. A first combination of ODW/DO, for example, enables EWOL 210 and OL 214 to read an even plane double word from EWP 206 to Memory Bus 134 while a second combination enables OWOL 212 and OL 214 to read an odd plane double word from OWP 208 to Memory Bus 134. Yet a third combination of ODW/DO enables the data input paths to EWP 206 and OWP 208 to write double words into the memory planes.

As shown therein, OCL 222 includes Memory Unit Control And Timing Logic (MUCT) 224, Address Range Logic (AR) 226, and Address Comparator (AC) 228. Referring first to AR 226, AR 226 includes a set of internal address jumper connections which may be set to correspond to the storage capacity and type of memory elements of the particular MU 130. AR 226 also receives an input, High Address Previous (HAP), from the MU 130 having the next longer range of addresses. This HAP input from the previous MU 130 indicates the highest order address contained in that previous MU 130, and thus the lowest, or starting, address of the present MU 130. AR 226 includes an adder which, in response to address inputs and the MU 130 address range wired thereinto by the jumpers, generates an output High Address (HA) to the next higher address range MU 130 indicating the highest address contained in the present MU 130. AR 226 further provides an output to MUCT 224 indicating the capacity of the present MU 130, as affecting certain memory operations, and provides outputs to AC 228 indicating the lowest and highest addresses residing in the present MU 130.

In addition to the address range information provided by AR 226, AC 228 receives the 24 bits of address provided at the output of AB 220 and compares the range of addresses residing in the present MU 130 to any addresses appearing from AB 220. If a particular address falls within the range residing in the present MU 130, AC 228 generates an output to MUCT 224 indicating this occurrence and thereby initiating a memory operation by the present MU 130.

Referring finally to MUCT 224, MUCT 224 is responsive to the above described inputs from AR 226 and AC 228 and the control inputs from MCU 132 to generate and provide the timing and control signals necessary to control the elements of the MU 130 in executing the indicated memory operation. MUCT 224 generates, for example, row and column address strobes for EWP 206 and OWP 208, individual write enable commands for the sub-planes comprising EWP 206 and OWP 208 and enable signals for EWOL 210, OWOT 212, Ib 216, DB 218 and AB 220. As will be described below, MUCT 224 also generates certain control signals for the MU 130 addressing logic.

In addition to MU 130 internal control signals, MUCT 224 generates certain control signals to MCU 132 to indicate the state of operation of the MU 130. An example is a signal indicating that an MU 130 of the MUs 130 in MM 106 contains an address corresponding to one provided by MCU 132 and is responding to the requested operation.

As the detailed design of a MUCT 224 will be well understood by one of ordinary skill in the art, given the descriptions herein of the functions performed, MUCT 224 will not be described in further detail herein.

Referring now to the MU 130 addressing logic, as shown in FIG. 2 the address inputs of EWP 206 and OWP 208 are provided through paths comprised of a Row/Column Address Multiplexer (RCAM) and a Sequential Address Generator (SAG). The RCAMs and SAGs for EWP 206 and OWP 208 are respectively designated in FIG. 2 as ERCAM 230 and ESAG 232 and ORCAM 234 and OSAG 236.

As shown in FIG. 2, ERCAM 230 and ORCAM 234 have outputs connected respectively to the address inputs of EWP 206 and OWP 208 and have first inputs connected from certain of the address bits provided from AB 220 and second inputs connected from, respectively, the outputs of ESAG 232 and OSAG 236. ESAG 232 and OSAG 236 in turn have address inputs connected from certain of the address bits provided from AB 220 and control inputs connected from MUCT 224.

As previously described, the memory elements of EWP 206 and OWP 209 are organized as rows and and columns of memory storage locations. The storage locations therein are correspondingly addressed by the sequential presentation of row and column addresses to the address inputs of EWP 206 and OWP 208, with a particular combination of a row address and a corresponding column address identifying a corresponding storage location in the memory planes. Each such combination of a row address and corresponding column address is, in turn, derived from a 24 bit address presented at the output of AB 220, with a portion of the 24 address bits being used as row address bits and other of the 24 bits being used to derive the corresponding column address bits.

As indicated in FIG. 2, the first inputs of ERCAM 230 and ORCAM 234, which are connected directly from the outputs of AB 220, comprise the row addresses of storage locations within EWP 206 and OWP 208. The second inputs of ERCAM 230 and ORCAM 234, which are connected from the outputs of ESAG 232 and OSAG 236, comprise in turn the corresponding column addresses of the storage locations within EWP 206 and OWP 208. ERCAM 230 and ORCAM 234 then operate under control of MUCT 224 to sequentially multiplex these row and column address inputs to the address inputs of EWP 206 and OWP 208 to select storage locations therein.

Considering now the operation of ESAG 232 and OSAG 236, as previously described the address space of EWP 206 and OWP 208 is organized such that the address locations of successive double words are located alternately in EWP 206 and OWP 208, with even numbered addresses located in EWP 206 and odd numbered addresses located in OWP 208. In addition, successive locations within a memory plane, that is, successive even address locations within EWP 206 or successive odd address locations within OWP 208, are located at successive column address locations within those memory planes with the two single words comprising a given double word residing in corresponding locations in the sub-planes. Successive even address or successive odd address locations in EWP 206 and OWP 208 may therefore be selected by essentially providing a single row address and successive column addresses.

Considering first the reading of a single double word from a MU 130, identical row and column addresses are provided to both EWP 260 and OWP 208. This single row/column address combination results in parallel, concurrent reads of two successively addressed double words, each from its respective memory plane and into its respective memory plane output latch, that is, EWOL 210 and OWOL 212. The least significant address bit, which would normally be used to identify an odd or even address location within a memory, is then essentially used to select and read the particular addressed double word from its output latch and through OL 214 to Memory Bus 134.

The writing of a double word from Memory Bus 134 and into a location in either EWP 206 or OWP 208 is performed in essentially the same manner. In a write operation, however, the least significant address bit, selecting either an even or an odd address location, is used to enable the write enable strobes to the sub-planes of the memory plane containing the addressed write location.

The write of a single word into an MU 130 is similar to the write of a double word but involves the writing of that single word into a selected corresponding one of the sub-planes comprising EWP 206 and OWP 208. In this case, the address input is again used to select either EWP 206 or OWP 208, depending upon the write address. The address is then further used to enable the write enable strobe to the particular sub-plane containing the single word address location corresponding to the write address.

As further described above, a single address input from MCU 132 may be used to read a double word from each of EWP 206 and OWP 208, that is, an even or odd double word from one memory plane and the next successive odd or even double word from the other memory plane. In such an operation, identical row and column addresses are again provided to both EWP 206 and OWP 208. This single row/column address combination again results in parallel, concurrent reads of two successive double words, each from its respective memory plane and into its respective memory plane output latch, that is, EWOL 210 and OWOL 212. MUCT 224 then, in response to a quad-word read command provided by MCU 132, selects and reads the two double words from the memory plane output latches and through OL 214 to Memory Bus 134 in the order indicated by the initial address provided by MCU 132, that is, odd word first if the address was odd or even word first if the initial address was even.

MUs 130 further allow the execution of multiple, successive such quad-word (four word) read operations in response to a single address input. In the present implementation, for example, the provision of a single address and corresponding command from MCU 132 to an MU 130 can result in two successive quad-word read operations, so that eight words are read in a single operation referred to as an octal-word read.

The execution of multiple, successive quad-word reads, such as an octal-word read, requires, as described above, the generation of a single row address and corresponding, successive column addresses. The generation of successive column addresses is performed by ESAG 232 and OSAG 236.

In this respect, ESAG 232 and OSAG 236 are essentially adders having as first inputs the column addresses provided from the outputs of AB 220. The ESAG and OSAG 236 adders are each further provided with second inputs comprising a plurality of hard-wired address increments representing the range of multiple reads which may be performed in a single memory operation. For example, if an MU 130 were to be capable of performing up to two successive quad-word reads, that is, a read of up to eight words, the ESAG 232 and OSAG 236 adders would be provided with hard-wired increment inputs representing increments of 0, 1 and 2, so that either would be capable of generating the address representing the initial address provided from AB 220 (add 0), the address of a next quad-word (add 1), and the address of a second next quad-word (add 2). It should be noted that, in this case, the provision of 0, 1 and 2 increment inputs to ESAG 232 and the provision of 0 and 1 increment inputs to OSAG 236 are sufficient to allow the read of up to 8 words from the MU 130.

In the present implementation, ESAG 232 and OSAG 236 each concurrently generate all possible addresses from the combination of the initial address input and the hard-wired address increment inputs. In the present case, for example, where an MU 130 is capable of reading 8 words in a single memory operation, ESAG 232 and OSAG 236 generate an address output representing the initial address (add 0) for a double word read, an address output representing the next double word (add 1) for a quad word read, and an address output representing the second next double word (add 2) for an 8 word read. The command input Address Select (AS) provided from MUCT 224 selects, as appropriate for the commanded memory operation, the ESAG 232 and OSAG 236 address outputs necessary to accordingly address and read EWP 206 and OWP 208 to read therefrom the required number of words.

The first quad-word read operation of such successive read operations is performed in the same manner as described above. In this case, the address increment selected by MUCT 224 is zero. The address increments selected by MUCT 224 for successive quad-word reads to be executed in a single memory operation are increased successively by one for the second and further quad-word reads of the sequence. The selection of double words from the memory plane output latches and to Memory Bus 134 is performed, for each quad-word read of the sequence, as described above for a single quad word read. The successive generation of addresses by selection of increments allows the reading and transfer of successive double words to Memory Bus 134 and SD Bus 118, and thus to the requestor, at speeds of up to the bus data transfer rate. In this manner, the requestor may receive, in one memory read operation, a "burst" or sequence of successive double words at the bus transfer rate, thereby substantially enhancing the rate at which information may be read from MM 106.

B.3 Memory Control Unit (MCU) 132 (FIG. 3)

Having described the basic structure and operation of MUs 130, the structure and operation of MCU 132 will now be described with reference to FIG. 3.

As previously described, Memory Control Unit (MCU) 132 controls the reading and writing of data and instructions from and to MUs 130 and comprises the interface and communications link between the MUs 130 and the other elements of System 102. On one side, MCU 132 is bidirectionally connected to all other elements of System 102 through SB 114, which provides the primary communication link between all elements of System 102. As previously described, SB 114 includes SA Bus 116 for communicating addresses, SD Bus 118 for communicating information, that is, data and instructions, and SBC Bus 119 for communicating memory operation commands. On the other side, MCU 132 is bidirectionally connected to MUs 130 through Memory Bus 134, which communicates information and addresses between MCU 132 and the MUs 130, and through an internal memory control bus for communicating control signals between MCU 132 and the MUs 130.

Referring to FIG. 3, as shown therein MCU 132 is primarily comprised of data and address paths between SB 114 and MM 106's internal busses, including Memory Bus 134, and control logic for these paths. As such each of these paths and their operation will be considered in turn.

Referring first to the address paths, as shown in FIG. 3, MCU 132 has a 24 bit address input connected from SA Bus 116 and which follows two internal 24 bit paths. The first address path through MCU 132 is a buffered, or pipelined, path which includes Address Latch (AL) 302, Address Register (AR) 304 and and a first input of Refresh/Address Multiplexer (RAM) 306. The output of RAM 306 is connected to a first input of Memory Bus Output Multiplexer (MBOM 308) and the output of MBOM 308 is in turn connected to Memory Bus 134. It should be noted that the path of the address bits through MBOM 308 is, as previously described, organized to place the address bits onto the corresponding Memory Bus 134 bits designated to carry addresses to the inputs of the MUs 130. As will be described further below, this address path is used in buffered write operations wherein information to be written into an MU 130 is buffered, or held, in an MCU 132 latch before being written into an MU 130.

Essentially all write operations into MM 106 are buffered, or pipelined, writes. That is, the information and corresponding address are held in MCU 132 registers until the completion of a previously executing or pending operation, such as a previously requested write or read operation or a memory refresh operation, and then provided to the MUs 130. This pipeline is provided to enhance the overall speed of operation of System 102 in that an element thereof, such as PU 104 or SBI 110, may submit a memory operation request to MM 106 when that element is ready to do so, rather than having to await the completion of a present or pending MM 106 operation. The requesting element may then proceed with further operations without delay.

It should be noted that a buffered write may also occur, for example, in a byte or half-word write to MM 106 when the double word residing at the addressed write location is read from the MU 130, modified to contain the information to be written therein, and written back to the MU 130.

The second address path is a direct, non-pipelined path from SA Bus 116 to a second input of MBOM 308 and is used to provide addresses directly from SA Bus 116 to Memory Bus 134. This path is used, for example, when there are no previously executing or pending memory operations. A memory request occurring in such conditions may thereby begin execution immediately, enhancing the speed with which MM 106 responds to such a request and enhancing the overall speed of operation of System 102. Again, the bits this address path through MBOM 308 are organized in the same manner as the first address input of MBOM 308, that is, to place the address bits onto the corresponding Memory Bus 134 bits designated to carry addresses to the inputs of the MUs 130.

It should be noted that all addresses provided to MCU 132 are latched in AL 302 and AR 304, even when an address is actually provided to MBOM 308 through the direct path.

Referring again to the first, pipelined address path, as shown in FIG. 3, a second input of RAM 306 is connected from the output of Refresh Address Generator (RAG) 310. RAG 310 generates memory refresh addresses, as is well known in the art, and these refresh addresses are provided to the MUs 130 through RAM 306 and MBOM 308 as required to perform memory refresh.

Considering now the information input and output paths, the information output paths, that is, the paths and operations involved in reading double words of information from the MUs 130, will be described first, followed by the input paths.

As previously described, the double words used internal to MM 106 each contain 78 bits rather than 64. of these 78 bits, 64 contain information and correspond to the 64 bits of the double word formats used in the remainder of System 102. The additional 14 bits are syndrome bits pertaining to the detection and correction of errors occurring in the 64 information bits. A 78 bit double word is in turn structured as a pair of 39 bit single words wherein each single word of the pair includes 32 information bits and 7 syndrome bits associated with those 32 information bits.

As shown in FIG. 3, the information output path within MCU 132 from Memory Bus 134, that is, from the MUs 130, is comprised of a 14 bit syndrome bit path and a 64 bit information path. The syndrome bit path is connected from Memory Bus 134 to the input of Syndrome Bit Latch (SBL) 316 and the information bit path is connected from Memory Bus 134 to the input of Information Output Latch (IOL) 318. Considering first the syndrome paths and logic, as shown in FIG. 3 the syndrome bits output of SBL 316 and the information bits output of IOL 318 are connected to inputs of Parity Logic (PL) 320. PL 320 operates upon the single words comprising a double word independently, that is, for each single word of a double word, PL 320 examines the 7 syndrome bits and 32 information bits of the single word to detect errors appearing in the 32 information bits. The results of this examination are passed to Syndrome Decode Logic (SDL) 322, which decodes these results and, if an error was detected in the 32 information bits of either single word of a double word, generates a new, corrected single words as required. Again, and for the purposes of the following descriptions, it must be noted that PL 320 and SDL 322 operate on the single words comprising a double word independently, that is, they treat the single words as complete and separate entities. As will be described below with reference to a single word write, PL 320 and SDL 322 may operate on a single word by itself.

Considering now the information output paths of MCU 132, the 64 bit information outputs of SDL 322 and IOL 318, providing respectively a new, corrected 64 bit information double word, comprised to two single words, and the double word of information originally read from an MU 130, are connected to inputs of Output Double Word Select Multiplexer (ODWS) 324. ODWS 324 selects either the new, corrected double word output of SDL 322 or the original double word output of IOL 318 to be the double word read from MM 106, depending upon whether an error was detected in the double word read from the MU 130.

The 64 bit double word output of ODWS 324 is connected to the input of Memory Output Latch (MOL) 326 and the output of MOL 326 is in turn connected to the input of Memory System Data Bus Driver (MSDBD) 328. The double word output selected by ODWS 324 is provided through this path to SD Bus 118 and thereby to the System 102 element having requested the read operation. It should be noted, in this regard, that MOL 326 is again a pipelining register, used in this case to hold a double word read from MM 106 until SD Bus 118 is free and the requesting element ready to accept the double word. This pipeline thereby frees the syndrome logic and paths for further operations, such as a next read operation or, as described below, a refresh or write operation.

Before describing write operations, it should be noted that memory refresh operations are essentially performed by executing single read-write operations wherein the words read from the MUs 130 are written back to the MUs 130 rather than being read to SD Bus 118. That is, words are read from the MUs 130 with the information bits again being written into IOL 318 while the syndrome bits are written into SBL 316. Again, if no errors are detected in a word read from the MUs 130, the word residing in IOL 318 is selected to appear at the output of ODWS 324. If, however, an error is detected, a new, corrected word is generated by SDL 322 and this word is selected to appear at the output of ODWS 324. It should be noted that single word write operations are described below and that byte and half-word writes, also described below, are, as are refresh operations, based upon single word writes.

As shown in FIG. 3, the 64 bit information output of ODWS 324 is, in addition to being connected to MOL 326 as described above, connected to a first input of Information Input Multiplexer (IIM) 330. The output of IIM 330 is in turn connected to a third input of MBOM 308 so that either the 64 information bits of a double word read from an MU 130 or the corrected 64 bits of information generated by SDL 322 may be transferred onto Memory Bus 134 and written back into the MU 130 from which it was read. It should be noted that, as described further below, IIM 330 further operates in partial double word writes of bytes and half words to perform read-modify-write operations wherein a partial double word of information is inserted into a double word already residing in an MU 130 to generate a new double word to be written into the MU 130.

It should be noted that PL 320 generates a new set of 14 syndrome bits corresponding to the double word to be written back into the MU 130, the 14 syndrome bits being comprised of two sets of 7 bits, one for each single word of the double word. The syndrome bits generation is performed concurrently with and in parallel with the selection of the double word to be written back to the MU 130 and these syndrome bits are provided to the corresponding 14 bits of Memory Bus 134, through Syndrome Output Multiplexer (SOM) 332, at the same time that the selected 64 bits of information are provided to the corresponding 64 bits of Memory Bus 134 through MBOM 308. The 14 bit syndrome output of PL 320 and the 64 bit information output of ODWS 324 together comprise the 78 bit double word to be written back to the MU 130 from which the double word was originally read. It should be noted that SOM 332 is provided with a second input, DIAG, connected from MCU 132's control circuitry, which is used in memory diagnostic operations.

Considering now the execution of write operations, as previously described all writes to MM 106 are in double word format, that is, information to be written into MM 106 is presented to MM 106 from SD Bus 118 in double words, each containing 64 bits. The actual item written may be a double word, that is, 64 bits of information, or may be a byte, a half word (2 bytes), or a word (4 bytes) of information and the bits of the word not containing information may be filled with null bits. In such cases, the byte, half-word or word of information will occupy a position in the double word format which corresponds to the position in the double word storage location in an MU 130 that the information is to be written into. For example, if a byte is to be written into an address location which corresponds to the least significant byte of an MU 130 double word location containing that address location, the byte will appear in the least significant byte of the double word format. As described below, MM 106 will extract the actual information bits from the double word format and write those bits into the correct locations in the MU 130 double word addressed by the write operation.

Considering first the case wherein the double word format contains a full 64 bits of information, the double words are written directly into the MU 130 location addressed by the write operation, the only operation performed by MCU 132 being the addition of the 14 syndrome bits.

Referring again to FIG. 3, as shown therein double word formats containing information to be writen into MM 106 are presented to MCU 132 from SD Bus 118 and through MSDBD 328, this portion of the MCU 132 input path being shared with the output path described above. The input path continues from the output of MSDBD 328 and to the dual, parallel 64 bit inputs of Information Input Latch (IIL) 334. IIL 334 operates as dual 64 bit wide registers to allow pipelining of writes into MM 106, with 64 bit double words to be written into MM 106 being buffered in and read from either of the two 64 bit registers in the sequence in which they are to be written.

As shown in FIG. 3, the 64 bit output of IIL 334 is connected to a second 64 bit input of Input Information Multiplexer (IIM) 330. As described above, the 64 bit output of IIM 330 is in turn connected to a third input of MBOM 308 and is connected to the 64 bit information input of PL 320. A double word selected from either of the dual registers of IIL 334 and appearing at the output of IIL 334 may thereby be read to either Memory Bus 134 or to PL 320.

In a write operation, the double word appearing at the output of IIL 334 is read to PL 320, wherein the previously described 14 syndrome or parity bits pertaining to that double word are generated. The 14 syndrome bits are then read through SOM 332 and to the 14 syndrome bits of Memory Bus 134 while the corresponding 64 information bits are read from IIL 334 and through IIM 330 and MBOM 308 to the 64 information bits of Memory Bus 134. The 14 syndrome bits provided from PL 320 and the 64 information bits provided from IIL 334 then comprise the 78 bit double word to be written into the MU 130 storage location indicated by the write address provided in the write request.

Considering now the write of a single word, as previously described single words are written directly into an MU 130 in a manner similar to that of a double word. In this case, one single word of a double word format received by MCU 132 will contain a word (32 bits) of information while the other word of the format may contain, for example, null bits. The "half-filled" double word is provided to the addressed MU 130 in the same manner and with the same operations by MCU 132 as described above with regard to a "full" double word. In this regard it should be noted that, as described above, PL 320 and SDL 322 operate on the two single words of a double word independently, that is, will generate the correct syndrome bits for the single word containing information. The "half-filled" double word and associated syndrome bits, that is, the single word containing information and its associated syndrome bits and the null single word and its syndrome bits are provided, as described above, to Memory Bus 134 and the MUs 130 through MBOM 308 and SOM 332 in the same manner as an actual double word.

The MU 130 write command accompanying the "half-filled" double word will, however, identify the operation as a single word write. The addressed MU 130 will then respond as previously described and write the information bearing single word into the addressed location in the appropriate sub-plane of its EWP 206 or OWP 208.

Considering now the execution of partial double word write operations, as described above a partial write occurs when the double word format presented to MM 106 contains only a byte or half-word of information. In such cases, that portion of the double word residing in the MU 130 storage location at the write address and corresponding to the information to be written must be replaced with the information to be written while the remaining information in that double word storage location remains unchanged. This replacement of the previously existing information with new information is performed by a read-modify-write operation.

In a partial write, the double word format containing the byte or half-word of information is received and latching into one of the dual registers of IIL 334. At the same time, the 64 information bits double word residing in an MU 130 at the write address are read from the MU 130 and latched into IOL 318, as previously described with reference to a read operation. The accompanying 14 syndrome bits are concurrently latched into SBL 316, as also previously described.

Again, PL 320 and SDL 322 operate upon the double word read from the MU 130 to determine whether errors are present and to generate a corrected double word at the output of ODWS 324 if errors are found. If no errors are present, the original double word residing in IOL 318 is provided as the output of ODWS 324.

The 64 bit output of ODWS 324 representing the contents of MM 106 at the write address is provided to the first input of IIM 330 while the 64 bit output of IIL 334 containing the information to be written is provided to the second input of IIM 330. The multiplexers comprising IIM 330 then select from the output of IIL 334 the byte or half-word of information to be written and select from the output of ODWS 324 the bytes of the original word which are to remain unchanged, that is, do not correspond to the bytes of information to be written. IIM 330 then combines these two selected groups of information bytes and provides a corresponding double word output wherein the bytes to be written have replaced the corresponding bytes in the original double word read from MM 106. As previously described, the remaining bytes of the original double word read from MM 106 and not corresponding to the information to be written remain unchanged.

The new double word is then provided, as previously described, to Memory Bus 134 through MBOM 308 and to PL 320, which generates and provides to Memory Bus 134 the corresponding syndrome bits. The new 78 bit double word is then written to the write address location in the MUs 130, replacing the double word originally residing therein.

Referring finally to MCU 132's control logic, as shown in FIG. 3 MCU 132 includes Memory Control Logic (MCL) 336 connected from SBC Bus 119 for receiving memory operation requests from other elements of System 102. MCL 336 receives and decodes the commands presented in such requests, as described below, and provides appropriate control signals to the elements of MCU 132 and, as previously described, to the MUs 130 through the memory internal control bus. MCL 336 also provides BUSY and WAIT commands to the other elements of System 102 which are requesting MM 106 operations. BUSY and WAIT indicate, respectively, that MM 106 is utilizing SB 114 and that SB 114 is therefore not available to other elements of System 102 and that requested data is not presently available from MM 106, for example, due to a previously pending or executing operation.

As shown in FIG. 3, MCL 336 has a first four bit input connected from SBC Bus 119 for receiving four bit memory operation command codes directly therefrom. A second four bit of MCL 336 is connected from the pipeline comprised of Command Latch (CL) 338 and Command Register (CR) 340, CL 338 having an input connected from SBC Bus 119 and being connected in series with CR 340, which has an output connected in turn to the second input of MCL 336. CL 338 and CR 340 are again provided for pipelining of memory operations and operate together with the previously described pipelines comprised of the dual register IIL 334, IOL 318 and MOL 326, and AL 302 and AR 304.

The detailed design of a memory control logic such as MCL 336 is well known in the art and will be understood by one of ordinary skill in the art after the previous descriptions of MUs 130 and MCU 132 and the following descriptions of the memory operation commands and timing diagrams illustrating the operations of MM106.

Memory operation commands, mentioned above, are transmitted from System 102 elements requesting memory operations, such as PU 104 or SBI 110, and through SBC Bus 119 to MCL 336 in MCU 132. In the present implementation, the memory operation commands include:

For reads from memory:
  Read Word—read a single word from MM 106;
  Read Double Word—read a double word from MM 106;
  Read Quad-Word—read two double words from MM 106;
  Read Octal Word—read four double words from MM 106;
For writes to Memory:
  Write Byte—perform a partial write of one byte;
  Write Half-Word—perform a partial write of a half-word;
  Write Word—perform a write of a word;
  Write Double Word—perform a write of a double word;
For reads from the MCU:
  Read MCU—a diagnostic command to read the contents of MCU 132's registers to the requester, for example, SCU 108;
For writes to the MCU:
  Write MCU—a diagnostic command to write the contents of MCU 132's registers from the requester, for example, SCU 108; and,
For refresh of memory:
  Refresh All Memories—no check of data; and,
  Refresh All Memories and Check Data—refresh memory and write back corrected data if necessary.

Referring to FIGS. 4A, 4B, 4C, 4D, 4E and 4F, therein are presented timing diagrams for, respectively, the reads of a word or double word, the read of an octal word, the write of a word or double word, the write of a byte or half-word, a refresh and a refresh with correction of the refreshed double word. The timing diagrams appearing in FIGS 4A through 4F are conventional and the information presented therein will be well understood by those of ordinary skill and will not be discussed in further detail, except for defining the terms appearing therein. In this regard:

The time scale appearing across the tops of FIGS. 4A to 4F is in terms of nanoseconds;
MEMCLK: Memory Clock;
ENABLE MEM CMD: Enable Memory Command, that is, MCU 132 is to receive a memory operation command code from SBC Bus 119;
SYS ADDR: System Address, that is, an address is presented to MCU 132 from SA Bus 116;
LATCH SYS ADDR: Latch System Address, that is, an address is to be latched into MCU 132's address registers;
ENABLE MEM DATA: Enable Memory Data, that is, data is enabled to be read from an MU 130;
MEM DATA: Memory Data, that is, data from MM 106 is available to be read to the requester;
ENABLE SYS DATA: Enable System Data, that is, requested data is valid and available to the requester;
SYS DATA: System Data, that is, the requested data is presented to the requester on SD Bus 118;
BUSY: defined above;
WAIT: defined above;
VMA: Valid Memory Access, that is, a requested memory operation is valid; and, ENABLE REF ADDR: Enable Refresh Address, that is, MCU 132 is enabled to provide a refresh address to MUs 130.

Finally, the following comments pertain to the general and overall operation of MCU 132 and the MUs 130 and, together with the above descriptions, will further illustrate the overall operation of MM 106.

First, in regard to writes to MM 106, an MCU 132 may acept two writes, either word or double word, and will hold the write requests in the buffer registers described above until the write operations caqn be executed. The MCU 132 may further hold a third write request on System Bus 114 until the first write operation is completed, thereby effectively using the system bus as a buffer.

When a requester initiates a write operation, the address of the request is compared to the maximum address residing in the MUs 130. If the address is within the valid range, the MCU 132 will inform the requestor that a valid memory access (VMA) has been made.

If MM 106 is performing a read-modify-write operation, as described above, and an uncorrectable data error appears, MCU 132 will inhibit the write back to the MUs 130 and will inform SCU 108 of the event for appropriate error handling. If a parity error appears in the information transmitted to MM 106 through the system bus, MCU 132 will similarly inform SCU 108 of the event for an appropriate error handling operation.

With regard to reads from MM 106, the address submitted by the requester is again, and as described above, compared to the address range residing in MM 106 and, if valid, the requester will again receive a VMA signal.

If an error appears in data read in response to a read request, MCU 132 will hold the requestor through a BUSY response until the data is corrected, if possible, and will provide the requester with a VMA and the data. If the data cannot be corrected, both the requester and SCU 108 are informed of this event and the requester does not receive a VMA.

Finally, MCU 132 will refresh all attached MUs 130 during the MM 106 refresh period. During this time, MCU 132 will supply a unique word address to the MUs 130 and, if a "match" occurs, will read the corresponding word to MCU 132. If refresh with correction is enabled, this word will be checked for errors. If an error is detected, the memory operation cycle will be extended to correct the word in memory. If the error is not correctable, the word will not be written back to an MU 130 and the SCU 108 will be informed of the event.

The invention described above may be embodied in yet other specific forms without departing from the spirit or essential characteristics thereof. Thus, the present embodiments are to be considered in all respects as illustrative and not restrictive, the scope of the invention being indicated by the appended claims rather than by the foregoing descriptions, and all changes which come within the meaning and range of equivalency of the claims are therefore intended to be embraced therein.

What is claimed is:

1. A memory unit for storing information units which is interconnected during operation with a main memory control unit, the memory unit comprising, in combination:
    a bus coupling the memory unit to the memory control unit for transferring in the alternative no more than a single information unit at one time and no more than a single memory address specifying an information unit in the memory unit at another time, the information unit being transferred either to or from the memory unit and the address being transferred only thereto;
    memory request receiving means coupling the memory unit to the memory control unit for receiving a read request which specifies a variable number of information units;
    memory storage means coupled to the bus for storing the information units and outputting information units in response to internal addresses; and
    internal control means coupled to the bus and to the memory request receiving means and responsive to the read request and a memory address received on the bus for providing a sequence of internal addresses which specifies a sequence of the information units, the sequence of information units always beginning with the information unit specified by the memory address, always having the information units ordered by increasing memory address, and always containing the number of information units specified by the read request, the number being independent of the memory address,
    whereby the memory unit outputs the sequence of information units specified by the memory address and the memory read request to the bus.

2. A memory unit as set forth in claim 1 wherein: the read request specifies 1, 2, or 4 information units.

3. A memory unit as set forth in claim 1 wherein: the memory storage means further includes
    first memory plane means for storing a first set of information units and outputting an information unit in response to a first internal address;
    second memory plane means for storing a second set of information units and outputting an information unit in response to a second internal address, the information units being so arranged in the first and second memory plane means that when equal first and second internal addresses are provided to the memory plane means, the information unit output from the first memory plane means is specified by a first memory address and the information unit output from the second memory means is specified by a second memory address which is the next higher memory address specifying an information unit; and
    output selection means coupled to the first and second memory plane means and the bus for selecting either the information unit output from the first memory plane means or the information unit output from the second memory plane means for output to the bus.

4. A memory unit as set forth in claim 3 wherein: the interal control means includes
    internal address providing means for simultaneously providing the first internal address and the second internal address as required to output the sequence of information units to the output selection means and
    output selection signal providing means coupled to the output selection means for providing output selection signals as required to cause the output selection means to output the sequence of information units to the bus.

5. A memory unit as set forth in claim 3 wherein: the output selection means further includes
    first output latch means coupled to the output of the first memory plane means and to the bus for retaining the information unit output from the first memory plane means and providing the retained information unit to the bus;

second output latch means coupled to the output of the second memory plane means and to the bus for retaining the information unit output from the second memory plane means and providing the retained information unit to the bus; and the output selection means selects either the information unit retained in the first output latch means or the information unit retained in the second output latch means for output to the bus.

6. A memory unit as set forth in claim 4 or claim 5 wherein: the internal address providing means includes first internal address providing means for providing from the memory address a sequence of the first internal addresses and second internal address providing means operating concurrently with the first internal address providing means for providing from the memory address a sequence of the second internal addresses, one member of each sequence being simultaneously output to the first and second memory plane means as required to output the sequence of information units.

7. A memory unit as set forth in claim 6 wherein: the read request specifies 1, 2, or 4 information units;

the sequence of first internal addresses includes a first address which, when applied to both memory plane means results in the output of the information unit specified by the memory address, a second address specifying the first information unit following the information unit specified by the first address in the first memory plane means, and a third address specifying the second information unit following the information unit specified by the first address in the first memory plane means;

the sequence of second internal addresses includes a first address which, when applied to both memory plane means results in the output of the information unit specified by the memory address and a second address specifying the first information unit following the information unit specified by the first address in the second memory plane means; and when the read request specifies 1 information unit, the first and second internal address providing means both output the first address from both sequences of internal addresses, when the read request specifies 2 information units and the information unit specified by the memory address is in the first plane, both internal address providing means output the first address, but when the information unit specified by the memory address is in the second plane, the first internal address providing means outputs the second address and the second internal address providing means outputs the first address; and when the read request specifies 4 information units and the information unit specified by the memory address is in the first plane, both internal address providing means output the first address followed by the second address, but when the information unit specified by the memory address is in the second plane, the first internal address providing means outputs the second address followed by the third address, while the second internal address providing means outputs the first address followed by the second address.

8. A memory unit for storing information units which is interconnected during operation with a main memory control unit, the memory unit comprising, in combination:

a bus coupling the memory unit to the memory control unit for transferring in the alternative no more than a single information unit at one time and no more than a single memory address specifying an information unit at another time, the information unit being transferred either to or from the memory unit and the address being transferred only thereto;

memory request receiving means coupling the memory unit to the memory control unit for receiving memory requests including a read request which specifies output of a sequence having a varying length of more than one information unit on the bus, the sequence always beginning with the information unit specified by a memory address received on the bus, always being ordered by increasing memory address, and always having the length specified in the read request, the length being independent of the memory address;

memory storage means for storing the information units and outputting them to the bus in response to internal addresses, the memory storage means including first memory plane means having an input coupled to the bus and an output for receiving and storing a first set of information units and outputting an information unit in response to a first internal address and second memory plane means having an input coupled to the bus and an output for receiving and storing a second set of information units and outputting an information unit in response to a second internal address, the information units being so arranged in the first and second memory plane means that when equal first and second internal addresses are provided to the memory plane means, the information unit output from the first memory plane means is specified by a first memory address and the information unit output from the second memory means is specified by a second memory address which is the next higher memory address specifying an information unit;

output selection means coupled to the outputs of the first and second memory plane means and to the bus for selecting information units output by the memory plane means for output to the bus, the output selection means including first output latch means coupled to the output of the first memory plane means and to the bus for retaining the information unit output from the first memory plane means and second output latch means coupled to the output of the output of the second memory plane and to the bus for retaining the information unit output from the second memory plane means;

internal address providing means including address buffer means coupled to the bus for receiving and retaining the memory address, first internal address providing means coupled to the address buffer and the first memory plane means for providing a sequence of first internal addresses derived from the retained memory address, and second internal address providing means coupled to the address buffer and the second memory plane means for providing a sequence of second internal addresses derived from the retained memory address; and internal control means coupled to the memory request receiving means, the output selection means, and the first and second internal address providing means for responding to the read request by causing the address buffer to retain the memory address received on the bus, causing the first and second internal address providing means to simultaneously provide sequences of first and second internal addresses such that the first and second memory plane means output pairs of adjacent information units beginning with the first and second information units in the sequence to the first and second output latch means and continuing in order through the sequence, and causing the output selection means to serially output to the bus the information units from the first and second output latch means in the order of the sequence, whereby a sequence of more than one information unit may be output from the memory means in response to a single memory address.

9. A memory unit as set forth in claim 8 wherein:
the memory request is received in the memory request receiving means substantially simultaneously with the receipt of a memory address on the bus 10. A memory unit as set forth in claim 8 wherein:
the information unit includes a plurality of words;
the memory requests further include a write single word request;
the memory means further includes input data buffer means coupled to the bus and to the memory plane means for retaining data input on the bus;
the memory address additionally addresses a word within an information unit;
the first and second memory plane means include subplane means for storing words, the subplane means being capable of being separately enabled for writing; and
the control means is coupled to the input data buffer means, to the subplane means, and to the output of the address buffer means and responds to the write single word request and the memory address by
causing the address buffer means to retain the memory address,
causing the data input buffer means to retain the word to be written,
causing the first and second address providing means to simultaneously provide first and second internal addresses such that the information unit containing the location specified by the memory address is addressed, and
enabling the subplane in which the word specified by the memory address is located for writing.

11. A memory unit as set forth in claim 10 wherein:
the memory request is received in the memory request receiving means substantially simultaneously with the receipt of a memory address on the bus and
when the memory request is a write single word request, the word is received on the bus following the receipt of the memory address.

12. A memory unit for storing information units which is interconnected during operation with a main memory control unit, the memory unit comprising in combination:

a bus coupling the memory unit to the memory control unit for transferring in the alternative no more than a single information unit at one time and no more than a single memory address specifying an information unit at another time, the information unit being transferred either to or from the memory unit and the address being transferred only thereto;

memory request receiving means coupling the memory unit to the memory control unit for receiving a read request which specifies a number of information units; and information unit storage means coupled to the bus and to the memory request receiving means for storing information units and responding to a memory address received on the bus and to a multiple information unit read request by serially outputting to the bus a sequence of at least one of the information units, the sequence always beginning with the information unit specified by the memory address, always having the information units ordered by increasing memory address, and always containing the number of information units specified by the multiple information unit read request, the number of information units being independent of the memory address, whereby a single memory address is used to obtain a serial burst of information units.

13. The memory unit set forth in claim 12 wherein:
the multiple information unit read request further includes information unit selection signals;
the memory unit further includes output selection means connected between the memory storage means and the bus;
the memory storage means simultaneously outputs two adjacent information units belonging to the sequence; and
the output selection means is responsive to the information unit selection signals to output the adjacent information units as required for the sequence.

14. The memory unit set forth in claim 12 wherein:
the multiple information unit read request is received in the memory request receiving means substantially simultaneously with the receipt of a memory address on the bus.

15. An information processing system comprising, in combination:
(1) a processing unit;
(2) a system bus coupled to the processing unit, the system bus having separate data, address, and control lines; and
(3) a main memory system including
(a) a memory control unit coupled during operation to the system bus for receiving system addresses specifying words and double words of data on the address lines and memory commands on the control lines and receiving and providing system data including words
and double words on the data lines and for providing memory addresses derived from the system addresses and memory requests derived from the memory commands and providing information units containing a word or double word derived from the received system data and receiving information units from which the provided system data is derived, the memory commands including read commands including
a read double word command for reading a single double word and a
read multiple double word command for reading a sequence having a specified length of more than one double word,
write commands including
a write word command for writing a single word and
a write double word command for writing a single double word and
the memory requests including read requests including
a read double word request for reading a single double word and
a read multiple double word request for reading a sequence having a specified length of more than one double word, and
write requests including
a write word request for writing a single word and
a write double word request for writing a single double word;
(b) a memory bus coupled to the memory control unit for transferring in the alternative no more than a single information unit at one time and no more than a single memory address specifying an information unit or a word therein at another time, the information unit being transferred either to or from the memory unit and the address being transferred only thereto;
(c) memory request transfer means coupled to the memory control unit for transferring the memory requests; and
(d) a memory unit which is coupled to the memory bus and to the memory request transfer means for storing information units and responding to a memory address and to a read request by outputting at least one information unit and to a write request by writing the information unit or a word contained therein at the location in the memory unit specified by the memory address, and wherein the memory control unit responds to the read double word command and the system address by providing the memory address of the information unit containing the double word and the read double word request to the memory unit, the memory unit responds thereto by outputting the addressed information unit to the memory bus, and the memory control unit outputs the double words contained in the addressed information unit from the memory bus to the system bus, the memory control unit responds to the read multiple double word command and the system address by providing the memory address of the information unit containing the double word specified by the system address and a read multiple double word request specifying the length specified in the read multiple double word command, the memory unit responds thereto by serially outputting a fixed-length sequence of more than one information unit to the memory bus, the sequence always beginning with the information unit specified by a memory address received on the bus, always being ordered by increasing memory address, and always having the length specified in the read request, the length being independent of the memory address, and the memory control unit serially outputs the double words contained in the specified sequence of information units from the memory bus to the system bus, the memory control unit responds to the write single word command and the system address by receiving the word to be written and the system address from the system bus and providing the memory address of the word specified by the system address, the word to be written, and a write single word request to the memory unit, the memory unit responding thereto by writing the word at the location specified by the memory address, and the memory control unit responds to the write double word command, the system address, and the double word by receiving the double word and the system address from the system bus, providing the memory address of the double word specified by the system address, the double word to be written, and a write double word request to the memory unit, the memory unit responding thereto by writing the double word at the location specified by the memory address, whereby the memory system writes words and double words and reads double words and multiple double words.

16. The information processing system set forth in claim 15 wherein:
the information unit includes a plurality of error correction bits in addition to words;
the system bus control lines further carry a valid memory access signal indicating that the data on the data lines is valid; and
the memory control unit further includes
means for adding error correction bits associated with the content of the words in each information unit which the memory control unit provides to the memory unit and
means for comparing the content of the words in each information unit received in the memory control unit from the memory unit with the information unit's error correction bits to detect errors, attempting to correct any error detected, and if there is no error or the error is correctible, providing the valid memory access signal to the system bus control lines, but not providing the valid memory access signal if the error is not correctible.

17. The information processing system set forth in claim 15 wherein:
the memory control unit provides the memory request and the memory address to the memory unit substantially simultaneously.

* * * * *